(12) United States Patent
Mathew et al.

(10) Patent No.: US 12,433,359 B2
(45) Date of Patent: Oct. 7, 2025

(54) ELASTOMERIC RUBBER GLOVES WITH IMPROVED SKIN HYDRATION CHARACTERISTICS

(71) Applicant: YTY Industry Sdn Bhd, Kuala Lumpur (MY)

(72) Inventors: Monichan Puthuvelil Mathew, Kuala Lumpur (MY); Shonia Nair, Kluang (MY); Andrew Kells, Kuala Lumpur (MY)

(73) Assignee: YTY INDUSTRY SDN BHD., Kuala Lumpur (MY)

( * ) Notice: Subject to any disclaimer, the term of this patent is extended or adjusted under 35 U.S.C. 154(b) by 279 days.

(21) Appl. No.: 17/654,940

(22) Filed: Mar. 15, 2022

(65) Prior Publication Data
US 2022/0330635 A1   Oct. 20, 2022

Related U.S. Application Data

(60) Provisional application No. 63/174,987, filed on Apr. 14, 2021.

(51) Int. Cl.
| | | |
|---|---|---|
| *A41D 19/00* | (2006.01) | |
| *B29C 41/00* | (2006.01) | |
| *B32B 25/04* | (2006.01) | |
| *B32B 25/20* | (2006.01) | |

(52) U.S. Cl.
CPC ..... *A41D 19/0082* (2013.01); *A41D 19/0062* (2013.01); *A41D 2500/54* (2013.01)

(58) Field of Classification Search
CPC ............ A41D 19/0082; A41D 19/0062; A41D 19/0068; A41D 19/0072; A41D 2500/54; B32B 25/04; B32B 25/20
See application file for complete search history.

(56) References Cited

U.S. PATENT DOCUMENTS

| | | | | |
|---|---|---|---|---|
| 6,075,081 | A * | 6/2000 | Nile | C08J 5/02 |
| | | | | 524/840 |
| 6,329,444 | B1 * | 12/2001 | McGlothlin | C08J 5/02 |
| | | | | 523/105 |
| 6,709,725 | B1 | 3/2004 | Lai et al. | |
| 6,953,582 | B2 | 10/2005 | Chou | |
| 7,971,276 | B2 | 7/2011 | Eng et al. | |
| 10,589,134 | B2 | 3/2020 | Hoffman et al. | |

(Continued)

*Primary Examiner* — Joanna Pleszczynska
(74) *Attorney, Agent, or Firm* — Kwan & Olynick LLP

(57) ABSTRACT

According to various embodiments, a glove is provided with improved hydration characteristics and low dermatitis potential. The glove comprises a substrate and a polymer system that coats a surface of the substrate. The polymer system comprises: a polyol, a botanical extract, an emollient agent, a silicone copolymer dispersion, a lubricant, and a surfactant. The substrate may be free of sulphur and accelerators. An example formulation of the polymer system may comprise glycerol, Aloe vera, a carnauba wax dispersion, dimethicone, a polyalkylene glycol (PAG), and polyoxyethylene (20) sorbitan monooleate. The polymer system may be applied to the\surface of the substrate by dipping the surface into a water-based dispersion of the polymer system, or spraying the water-based dispersion onto the interior surface. The polymer system may be blended into water at a total solids content of 0.8% to 1.2% w/w to form the water-based dispersion.

21 Claims, 4 Drawing Sheets

(56) References Cited

U.S. PATENT DOCUMENTS

| | | | |
|---|---|---|---|
| 2004/0115250 A1* | 6/2004 | Loo | C08J 7/065 |
| | | | 424/443 |
| 2006/0212992 A1* | 9/2006 | Nile | A61L 31/10 |
| | | | 2/168 |
| 2014/0271863 A1* | 9/2014 | Anderson | A61K 47/32 |
| | | | 424/486 |
| 2018/0193237 A1* | 7/2018 | Foo | A41D 13/087 |
| 2020/0206392 A1 | 7/2020 | Wang et al. | |
| 2021/0378333 A1 | 12/2021 | Mathew et al. | |

* cited by examiner

ELASTOMERIC RUBBER GLOVES WITH IMPROVED SKIN HYDRATION CHARACTERISTICS

CROSS-REFERENCE TO RELATED APPLICATIONS

Pursuant to 35 U.S.C. § 119(e), this application is entitled to and claims the benefit of the filing date of U.S. Provisional App. No. 63/174,987, titled "ELASTOMERIC RUBBER GLOVES WITH IMPROVED SKIN HYDRATION CHARACTERISTICS", filed Apr. 14, 2021, the content of which is incorporated herein by reference in its entirety for all purposes.

TECHNICAL FIELD

The present disclosure relates generally to elastomeric articles for hand protection and more specifically to single use disposable gloves for medical, dental, industrial, and other specialty applications, including surgical gloves.

BACKGROUND

Elastomeric gloves, manufactured from natural and synthetic rubbers and other materials, are widely used in medical and other applications. To ensure good tactility the gloves should fit snuggly both on the fingers and the body of the hand. However, when gloves are worn for periods of time, this snug fit can cause excessive hand perspiration, which evaporates when the gloves are removed and can result in dryness, sensitivity, and possible infections.

In addition, professionals who rely on elastomeric articles, such as gloves, often work in clinical settings that require frequent hand washing and cleaning. For example, healthcare personnel must wash their hands or at least wipe their hands with sanitary alcohol formulations many times a day. When combined with frequent glove use, repeated use of cleansing agents such as soaps, sanitizers, and liquid hand wash will exacerbate skin problems further due to the removal of the skin's natural moisturizing factors and potential damage to the lipid barrier that retains skin moisture. At times, such as during a global pandemic, consumers and members of the public are also asked to frequently wash hands with soaps and decontaminate with sanitizers and anti-microbial solutions with high alcohol content and often wear protective elastomeric gloves in public places at malls, in grocery, and convenience stores and the like. Such behaviors may also lead to hand health problems in the wider public.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Some embodiments provide improved elastomeric rubber gloves address dryness and other hand health issues, and can be produced with no use of harmful curing or vulcanization chemicals. In general, some embodiments of the present disclosure provide a glove with improved skin hydrating characteristics and low dermatitis potential. The glove comprises a substrate and a polymer system coating an interior surface of the substrate. The polymer system comprises: a polyol, a botanical extract, an emollient agent, a silicone copolymer dispersion, a lubricant, and a surfactant. The substrate may be free of sulphur and accelerators.

The polymer system may be applied to the interior surface by dipping the interior surface into a water-based dispersion of the polymer system. The botanical extract may comprise a combination of one or more of the following: Aloe vera powder, Aloe vera gel, argan oil, shea oil, and chamomile oil. The botanical extract may comprise Aloe vera and may be present in the water-based dispersion at a range of 0.05% to 1.00% w/w. The polyol may comprise glycerol, and the polyol may be present in the water-based dispersion at a range of 0.10% to 3.00% w/w. The silicone copolymer dispersion may comprise dimethicone, and the silicone copolymer dispersion may be present in the water-based dispersion at a range of 0.05% to 2.00% w/w. The surfactant may comprise polyoxyethylene (20) sorbitan monooleate, and the surfactant may be present in the water-based dispersion at a range of 0.05% to 0.50% w/w. The lubricant may comprise a polyalkylene glycol (PAG), and the lubricant may be present in the water-based dispersion at a range of 0.05% to 0.50% w/w. The emollient agent may comprise a carnauba wax dispersion, and the emollient agent may be present in the water-based dispersion at a range of 0.05% to 2.00% w/w.

The polymer system may be blended into water at a total solids content of 0.8% to 1.2% w/w to form the water-based dispersion. The interior surface may be non-chlorinated or exposed to chlorination levels under 600 parts per million (ppm). The glove may comprise the polymer system in an amount between 0.1 grams and 0.3 grams on a dry basis.

Other implementations of this disclosure include other wearable articles and methods corresponding to the described gloves and articles. These other implementations may each optionally include one or more of the following features. For instance, a protective article comprises a substrate with a first surface and a polymer system coating the first surface of the substrate. The substrate may be free of sulphur and accelerators. The polymer system comprises: a polyol, a botanical extract, an emollient agent, a silicone copolymer dispersion, a lubricant, and a surfactant.

Also, a method comprises forming an elastomeric rubber glove substrate on a mold. The elastomeric rubber glove substrate may be free of sulphur and accelerators. The method further comprises applying a polymer system onto an interior surface of the elastomeric rubber glove. The polymer system comprises: a polyol, a botanical extract, an emollient agent, a silicone copolymer dispersion, a lubricant, and a surfactant.

Applying the polymer system may comprise dipping the interior surface into a dilute aqueous dispersion of the polymer system. The polymer system may be blended into water at a total solids content of 0.8% to 1.2% w/w to form the water-based dispersion. Applying the polymer system may comprise spraying a dilute aqueous solution of the polymer system onto the interior surface.

The method may further comprise removing the elastomeric rubber glove from the mold before applying the polymer system, and applying the polymer system may comprise wet tumbling the elastomeric rubber glove in a dilute aqueous dispersion of the polymer system.

The method may further comprise chlorinating the interior surface before applying the polymer system onto the interior surface, such that the interior surface includes chlorination levels between 0 parts per million (ppm) and 600 ppm. The method may further comprise curing the elastomeric rubber glove before applying the polymer system onto the interior surface, and drying the elastomeric rubber glove after applying the polymer system onto the interior surface.

These and other embodiments are described further below.

DETAILED DESCRIPTION

Figure 1A:
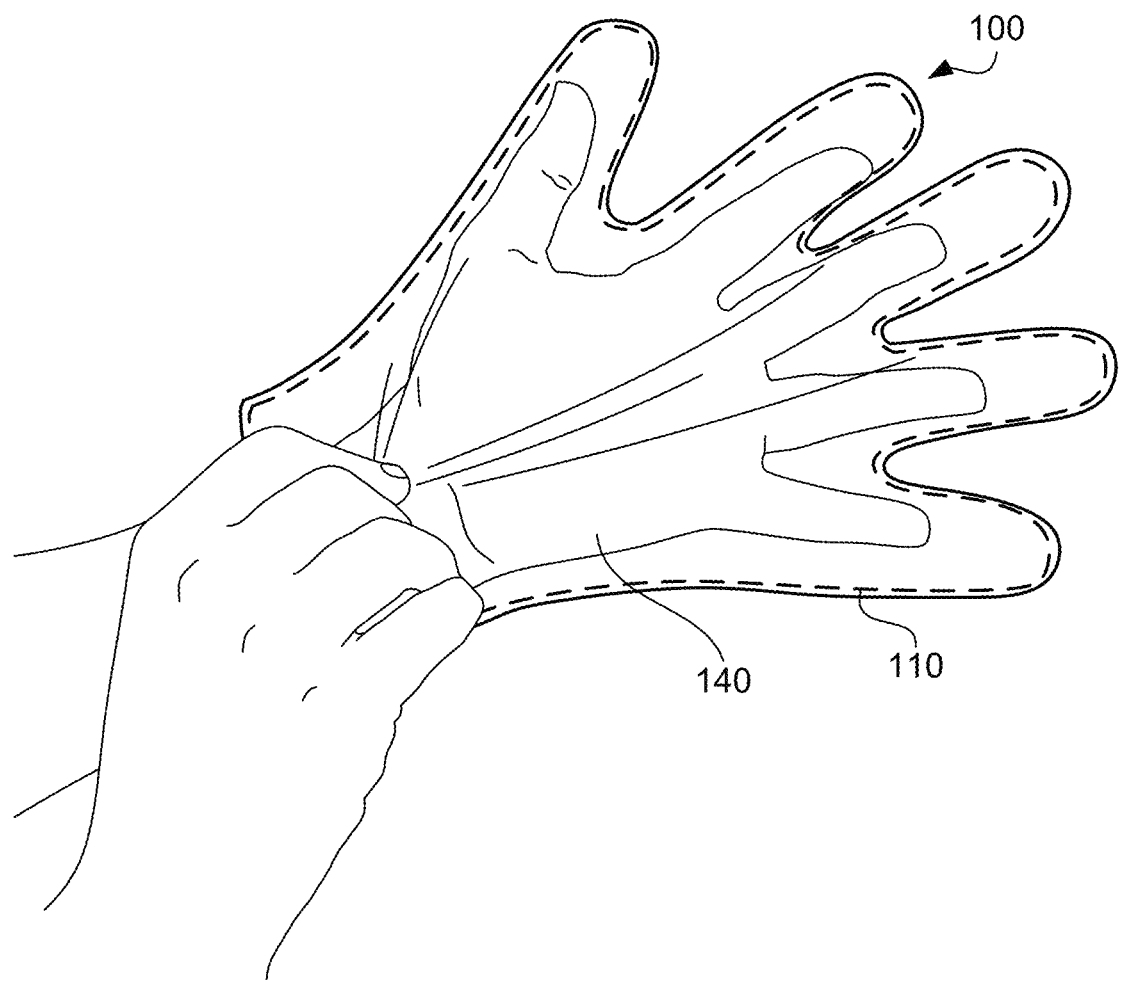
FIGS. 1A and 1B illustrate examples of wearable articles with a polymer system coating, in accordance with one or more embodiments.

Reference will now be made in detail to some specific examples of the disclosure including the best modes contemplated by the inventor for carrying out the disclosure. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the structure and mechanisms of the present disclosure will be described in the context of particular materials. However, it should be noted that the structure and mechanisms of the present disclosure may consists of a variety and/or combination of different related and applicable elastomeric materials known in the art. As another example, the systems and methods of the present disclosure will be described in the context of particular wearable articles, such as gloves. However, it should be understood that the systems and methods are applicable to various other wearable articles that may be worn by users for various purposes.

In the following description, numerous specific details are set forth in order to provide a thorough understanding of the present disclosure. Particular example embodiments of the present disclosure may be implemented without some or all of these specific details. In other instances, well known structures, mechanisms, and materials have not been described in detail in order not to unnecessarily obscure the present disclosure.

Overview

Elastomeric gloves, manufactured from natural and synthetic rubbers and other materials, are widely used in medical and other applications. To ensure good tactility the gloves should fit snuggly both on the fingers and the body of the hand. However, this snug fit can cause excessive hand perspiration and influences skin pH when such gloves are worn for varying periods of time. After the gloves are removed from the hand and the perspiration evaporates, the skin of the hand can easily become dry, sensitive and sometimes, even infected over time. This loss of moisture is not conducive to good hand skin health.

Removal of the gloves coupled with work regimes that require regular hand washing and cleaning often leads to poor skin health, including dryness, skin cracking, irritation and even infection. By example, in the context of healthcare workers who are required to follow a strict and standardized hand hygiene regimen to prevent the spread of healthcare associated infections, a typical regimen involves washing the hands using a cleanser and water and/or use of a hand sanitizing product, donning new gloves, removing and discarding used gloves, and washing hands using a cleanser and water and/or using a hand sanitizer product. This process may of course be repeated multiple times during the course of a working day. While this regimen is helpful in preventing the spread of infection, it may inflict damage to the hands and skin of healthcare workers, due to the removal of the skin's natural moisturizing factors and potential damage to the lipid barrier that retains skin moisture. Repeated use of cleansing agents such as soaps, sanitizers and liquid hand wash combined with frequent glove use, may exacerbate skin problems further. At this current time, during a global pandemic, consumers and members of the public are also being asked to frequently wash hands with sanitizers and anti-microbial solutions with high alcohol content and often wear protective elastomeric gloves in public places at malls, in grocery, and convenience stores and the like. Such behaviors may also lead to hand health problems in the wider public.

Embodiments provide elastomeric gloves that can prevent adverse skin health issues and side effects. Different types of gloves that contain moisturizers and lotions have previously been disclosed. However, a consistent feature of the prior art is that elastomeric gloves made from latex and synthetic rubber, such as carboxylated acrylonitrile butadiene rubber latex (xNBR) most often referred to as nitrile rubber, chlorobutadiene rubber latex most often referred to as chloroprene rubber (CR), methyl-butadiene rubber latex most often referred to as isoprene rubber (IR), and the like, utilize costly multi-step off line manufacturing methods to apply the moisturizer/lotion, and fail to provide high skin hydration as measured by a corneometer, and require significant levels of sulphur and accelerator combinations for conventional curing and vulcanization purposes. Studies have shown that utilizing a high level of curing/vulcanization chemicals including sulphur and accelerators may result in allergic reactions from the end user caused by residual accelerators (e.g., Type IV contact dermatitis).

The general purpose of the present disclosure, which will be described subsequently in greater detail, is to provide an improved elastomeric glove coated with a hydrating polymer system that counteracts the damaging effects of shortened or extended glove wear, and hand cleansing and sanitizing, and provides improved skin hydration thus maintaining or improving skin health. When used in combination with a glove comprising a sulphur accelerator free substrate, the hydrating effects and end user benefits may be further enhanced. The substrate may include the material of the glove, which will be described below. A novel formulation for a polymer system to coat elastomeric examination gloves is provided that comprises: one or more active ingredients combined with various humectants, occlusives, emollients, desquamation stimulators, exfoliants, along with lubricants, preservatives, and surfactants, which may combine to form beneficial agents and carriers to transport the active ingredients into and through layers of the skin. For example, a polyol such as glycerol may be included in the polymer system as a humectant, desquamation stimulator, exfoliant, and preservative. The polymer system may also incorporate one or more various botanical or plant extracts as active ingredients, such as that of Aloe vera, for its hydrating and other beneficial properties. Various included materials may also serve as donning agents to make donning (e.g., putting on) and doffing (e.g., removing) of the glove easier. For example, dimethicone is a silicone copolymer that may serve as an occlusive, emollient, and dry donning agent. The described formulations result in a coating with superior hydrating effects on the user's skin, which reduces water loss and maintains healthy skin pH. The coating may also provide other benefits such as sweat absorption.

In some embodiments, the inner surface polymer system composition is applied as an aqueous dispersion, and not as a powder. The aqueous dispersion may easily transfer to the substrate, and also evenly to the skin of the article's wearer, forming a beneficial coating on the skin that delivers hydration and prevents skin dermatitis and other skin irritations that may otherwise occur. Advantageously, the use of the described gloves may in fact improve the effectiveness of the liquid polymer present on the skin-contacting surface of the described gloves by providing for better composition transfer to the skin and resulting in increased, longer-lasting hydrating effects.

Examples of suitable articles for use with the present disclosure include gloves, such as surgical gloves, examination gloves and the like. The article may comprise an elastomeric, moisture impermeable substrate. Elastomeric substrates are particularly useful when the article is a glove, as it is highly desirable for the glove to be able to easily stretch to provide for easier glove donning. The article may be formed from a synthetic latex composition. For instance, the article may be formed from a synthetic rubber, a nitrile rubber, a polyisoprene, a polychloroprene, a neoprene, a styrene block copolymers, or any other suitable combinations thereof. Examples of suitable synthetic rubbers and elastomers can also include acrylic diene block co-polymers, acrylic rubber, butyl rubber, ethylene propylene diene monomer (EPDM) rubber, polybutadiene, and polyurethanes. In some embodiments, the elastomeric, moisture impermeable substrate of the article may be selected from the group of the synthetic latex compositions, rubber, and elastomers, etc., and combinations thereof. The combinations of synthetic latices may be in a single layer of an article or in multiple layers if required and as blends.

The described compositions and methods provide further advantages such as the elimination of sulphur, and vulcanization and rubber accelerators, thereby reducing harmful chemicals, potential allergic reactions from users, and overall manufacturing costs. Using the described methods and compositions, an elastomeric synthetic rubber glove can be manufactured efficiently and cost effectively using a continuous on line process and the glove can be formulated with no accelerators. When coated with the described polymer system, the interior surface of such gloves have shown more than a 300% improvement in hydration percentage increase as well as having a low dermatitis potential (as measured by the modified Draize-95 test). Existing gloves include emollients/lotions sprayed onto the interior to help reduce a user's skin damage. However, these gloves contain harmful residual chemicals and accelerators, which, may be effectively transported into the user's skin by having an emollient present, exacerbating type IV sensitivity within a user. The present disclosure addresses this undesirable effect and further provides related benefits that include synthetic rubber latex compositions and manufacturing methods, to efficiently produce gloves with a palm film thickness of around 0.05 mm or above. In addition, the methods facilitate a roughened and engineered interior surface providing highly receptive channels for a polymer coating yielding exceptional hydration and skin benefits over time. By granting an end user unparalleled levels of comfort and dexterity, delicate and nimble procedures can be performed with ease with no loss in productivity whilst favorably promoting a highly hydrated skin barrier and no sensitivity.

The disclosed gloves and coatings for such gloves also result in an improved elastomeric rubber glove that is produced powder-free. Such gloves also include minimal or no use of corrosive chlorination chemicals and instead rely on water-based polymeric coatings being applied directly to the elastomeric glove surface without pretreatment and additional complexity in manufacturing.

Example Embodiments

A rubber surface, such as the inner surface, of the glove may be modified using the polymer systems described herein, which may be also referred to as a coating, to improve skin hydrating properties and donning characteristics. The polymer system may include beneficial materials and active ingredients to retain moisture and maintain a healthy pH balance of the skin. Simultaneously, the coating provides a surface topography that reduces the contact area between the glove surface and the skin of the wearer. This smaller contact area results in lower frictional forces that need to be overcome to don the glove effectively without the need for excessive force and potential failure.

Figure 1B:
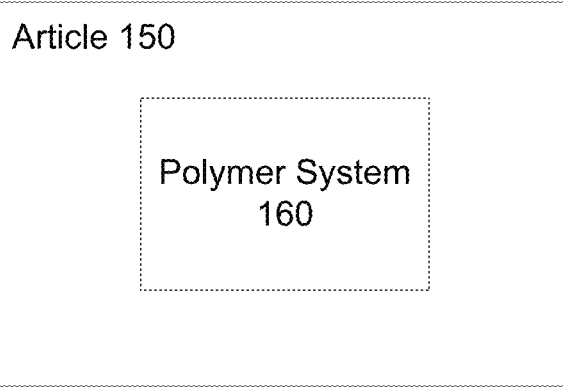

FIGS. 1A and 1B illustrate example wearable articles modified with a polymer system coating, in accordance with one or more embodiments. With reference to FIG. 1A, a glove 100 is being donned on a user's hand 140. As depicted, glove 100 comprises polymer system 110 (shown in dashed lines) that is applied to an interior surface of glove 100. The interior surface of the glove is on the inside of glove 100 and contacts hand 140 of the user. In various embodiments, glove 100 is an elastomeric rubber glove. For example, glove 100 may be manufactured from a range of elastomers including, but not limited to nitrile latex, polychloroprene latex, polyisoprene latex, styrene butadiene latices, acrylic latices, polyurethane dispersions and mixtures of the same using either a single or multiple coagulant dipping process as is understood by persons of ordinary skill in the art.

With reference to FIG. 1B, shown more generally is a wearable article 150 with polymer system 110. Wearable article 150 may be configured in different shapes. For example, wearable article 150 may be a protective article, such as an elastomeric rubber article configured for various parts of a user's body, such as socks or foot coverings, arm or leg sleeves, etc. It should be recognized that the polymer system described herein may be implemented with various such elastomeric and rubber articles. In various embodiments, wearable article 150 comprises polymer system 110 applied to various surfaces of article 150. In particular, polymer system 110 may be applied to surfaces configured to contact a user's skin when applied or in operation, which is typically on the interior surface of article 150. However, polymer system 110 may be applied to other surfaces of article 150 which may come into contact with a user's skin. Also, polymer system 110 may be applied to cover different portions of wearable article 150, such as the entirety of the interior surface of wearable article 150, portions of the interior surface, portions of the interior surface and exterior surface, and/or any combinations thereof. Polymer system 110, which may be implemented with various embodiments of the present disclosure, are further described below.

Specific selection of the described polymer system 110 achieves improved hydration of skin, and reduces or prevents any irritation of the skin of the user. Use of gloves coated with polymer system 110 may further maintain a healthy pH of the skin and reduce transepidermal water loss (TEWL) at the hand. Polymer system 110 may comprise a water-based emulsion of various components and may comprise a combination of one or more of the following: a polyol, a botanical extract, an emollient agent, a silicone copolymer dispersion, a lubricant, and a surfactant along with other functional materials.

In some embodiments, polymer system 110 includes a polyol, such as glycerol, for its various properties. For example, glycerol may function as a humectant in polymer system 110. In various embodiments, the primary role of a humectant in polymer system 110 is to bind and retain water molecules within the stratum corneum (SC) of the skin, thereby providing moisture to the skin tissues and enhancing skin moisturization. Glycerol is a polyol compound with hydroscopic attributes, and may prevent the crystallization of the lamellar structure of the stratum corneum at very low humidity, and reduces water loss from skin due to the interaction of glycerol molecules with SC bilayers, which increases the fluidity of the membrane of the skin cells. It should be recognized that various other polyols may be additionally, or alternatively, included in polymer system 110.

In some embodiments, polymer system 110 may include one or more additional materials with humectant properties. These other materials may include, without limitation, panthenol, sodium pyrrolidone carboxylic acid (PCA), sorbitol, urea, D-Serine, and L-Alanine. Panthenol includes a hydroxyl functional group within its chemical structure that provides humectant properties. Panthenol that is enzymatically converted to panthenoic acid can maintain the integrity of the skin barrier by catalyzing initial steps in the synthesis of SC lipids, such as fatty acids and sphingolipids. PCA is the main component of natural moisturizing factors in the SC lipids and have the ability to attract water molecules, such as to the equivalent of up to 250 times its weight.

Polymer system 110 may further comprise a silicone copolymer or polymeric siloxane for occlusive or emollient properties. For example, dimethicone is a silicone copolymer that may be included in polymer system 110 as an occlusive agent. In some embodiments, dimethicone may be provided as DOWSIL HMW 2220 or DOWSIL 3901.

In some embodiments, dimethicone may be provided in combination with beeswax and silica silylate, such as DOWSIL 9576. In some embodiments, the dimethicone may be provided as linoleamidopropyl PG-Dimonium chloride phosphate dimethicone (ARLASILK), or cyclopentasiloxane dimethiconol laureth-4, laureth-23 (DOWSIL 7-3100). In various embodiments, squalane is a polymer used as an alternative to dimethicone in polymer system 110. For example, squalane derived from palm oil (PRISORINE 3505) or olive oil (PRIPURE 3759) may be included in polymer system 110. In some embodiments, squalane may be included in addition to the described silicone copolymers.

Various lipid materials may be additionally, or alternatively, included for their occlusive and/or emollient properties. Such lipid materials may include, without limitation, lecithin, fatty acids, beeswax, paraffin, petrolatum, carnauba, lanolin, and a combination of beeswax and polyethylene glycol (PEG) such as CARBOWAX SENTRY PEG 400. For example, a carnauba wax dispersion may be included in polymer system 110 for emollient properties. MICHEM LUBE 156 is an example dispersion of carnauba wax that may be included in polymer system 110. In some embodiments, the lipid materials may include mixtures of various mineral waxes, fatty acid esters, fatty alcohols, and/or fatty acid salts. For example, DEHYMULS K may be included, which is a combination of petrolatum, decyl oleate, dicocoyl pentaerythrityl distearyl citrate, sorbitane sesquioleate, cera microcristallina (microcrystalline wax), paraffinum liquidum (mineral oil), cera alba (beeswax), and aluminum stearates, Polymer system 110 may include various lubricants to modify the viscosity of a water medium and introduce different surface energies at the interface between the aqueous and lipid phases of polymer system 110 to improve the blending of the components of polymer system 110. Lubricants may aid in the application of the coating onto the substrate of glove 100 by improving the effective dispersion of polymer system 110 onto the substrate surface and cause polymer system 110 to be applied more evenly. Once the coating of polymer system 110 has dried, particular lubricants may result in a surface texture that improves donning of the glove. Such lubricants may include polyalkylene glycols (PAGs) as base polymers. In some embodiments, these lubricants may be alcohol-started polymers containing equal amounts by weight of oxyethylene and oxypropylene groups. These lubricants may be water soluble at low temperatures below 40° C. and have one terminal hydroxyl group. In some embodiments, these lubricants may include additives such as oxidation inhibitors, lubricity and extreme-pressure modifiers, and corrosion inhibitors of both ferrous and/or nonferrous types. For example, polymer system 110 may include lubricants, such as, without limitation, UCON FLUID AP, UCON 50 HB5100, POLYOX WSR N-3000, UCARE, POLYQUTA 3000KC).

Various surfactants may also be included in polymer system 110 as wetting agents that reduce the contact angle between polymer system 110 and the surface of the glove or article. Such wetting would make polymer system 110 easier to spread and prevent it from balling up on the surface of the glove or article. Surfactants may also act as enhancers for percutaneous absorption where it may increase cosmetic penetration by causing the stratum corneum to swell and/or leach out some of the structural components, thus reducing the diffusional resistance and increasing the permeability of the skin, and improving the absorption of beneficial materials, such as Aloe vera. For example, polymer system 110 may include polysorbate 80 as a surfactant. Polysorbate 80 may be added as a surface active agent that binds itself to an active ingredient, such as Aloe vera and other carrier agents to aid in transdermal absorption of the active ingredient.

Polymer system 110 may include surfactants such as, without limitation, polyoxyethylene (20) sorbitan monooleate (polysorbate 80 or TWEEN 80), polyoxyethylene (20) sorbitan monolaurate (polysorbate 20 or TWEEN 20), SURFYNOL TG, nonylphenoxy ethanol (EMULGEN), LUTENSOL T08, and various nonyl phenol ethoxylates including TERIC 340, TERIC 320, and TERGITOL NP-9. Several nonionic surface active agents, closely related chemically to the polyethylene glycols, have been developed as suppository vehicles which are applicable for topical delivery or dispersion of active ingredients on the skin. Several polyoxyethylene sorbitan derivatives (such as polysorbate 80 or polysorbate 20), are designed to melt at body temperature into liquids that disperse readily when in contact with the epidermis.

Various plant or botanical extracts may also be included in polymer system 110 as active ingredients. These may be included for various associated properties such as antioxidant, anti-inflammatory, antiseptic, and antimicrobial properties. For example, Aloe vera may be included in the form of powder or gel. The Aloe vera raw materials used in polymer system 110 may include, without limitation, ACTIValoe® Aloe vera Leaf 200X Powders, Organic SQ Freeze Dried Aloe Vera Leaf 100X Powders, ACTIValoe® Aloe vera Gel, Certified Plus® Aloe vera Gel.

In some embodiments, the Aloe vera powders or gels used in polymer system 110 may have undergone an activated carbon-filtration and decolonization steps as part of their purification process. This process removes phenolic chemicals contained in Aloe vera latex such as anthraquinones glycosyl (Aloin) which are classified as a possible human carcinogen by the International Agency for Research on Cancer (IARC). Indeed, the purified (decolorized) Aloe vera powders or gels used in polymer system 110 may be free from possible human carcinogenic substances and only contain Aloe polysaccharides. According to a critical review published in the Journal of Environmental Science and Health Part C Environmental Carcinogenesis & Ecotoxicology Reviews, the highly purified decolorized Aloe vera extracts do not show significant cytotoxicity, mutagenicity and carcinogenicity based on the in-vivo toxicology studies performed. Nor do they require a Proposition 65 warning label.

Mucopolysaccharides present in the purified and decolorized Aloe vera can help in binding moisture into the skin. Aloe vera active ingredients may stimulate fibroblasts which produce collagen and elastin fibers, making the skin more elastic and less wrinkled. The mucopolysaccharides also have cohesive effects on the superficial flaking epidermal cells by sticking them together, which softens the skin. The presence of amino acids also softens hardened skin cells.

Aloe vera has been reported to have a protective effect against radiation damage to the skin. Metallothionein, an antioxidant protein, is generated in the skin, which scavenges hydroxyl radicals and prevents suppression of superoxide dismutase and glutathione peroxidase in the skin. Added Aloe vera extracts may also reduce the production and release of skin keratinocyte-derived immunosuppressive cytokines such as interleukin-10 (IL-10) and hence prevents UV-induced suppression of delayed type hypersensitivity. Other botanical extracts may include argan and shea oils. In some embodiments, chamomile, safflower, jojoba, avocado, or *eucalyptus* oils may additionally be included. For example, chamomile oil may provide antimicrobial, antiallergic, anti-inflammatory, antioxidant, and analgesic effects.

Figure 2:
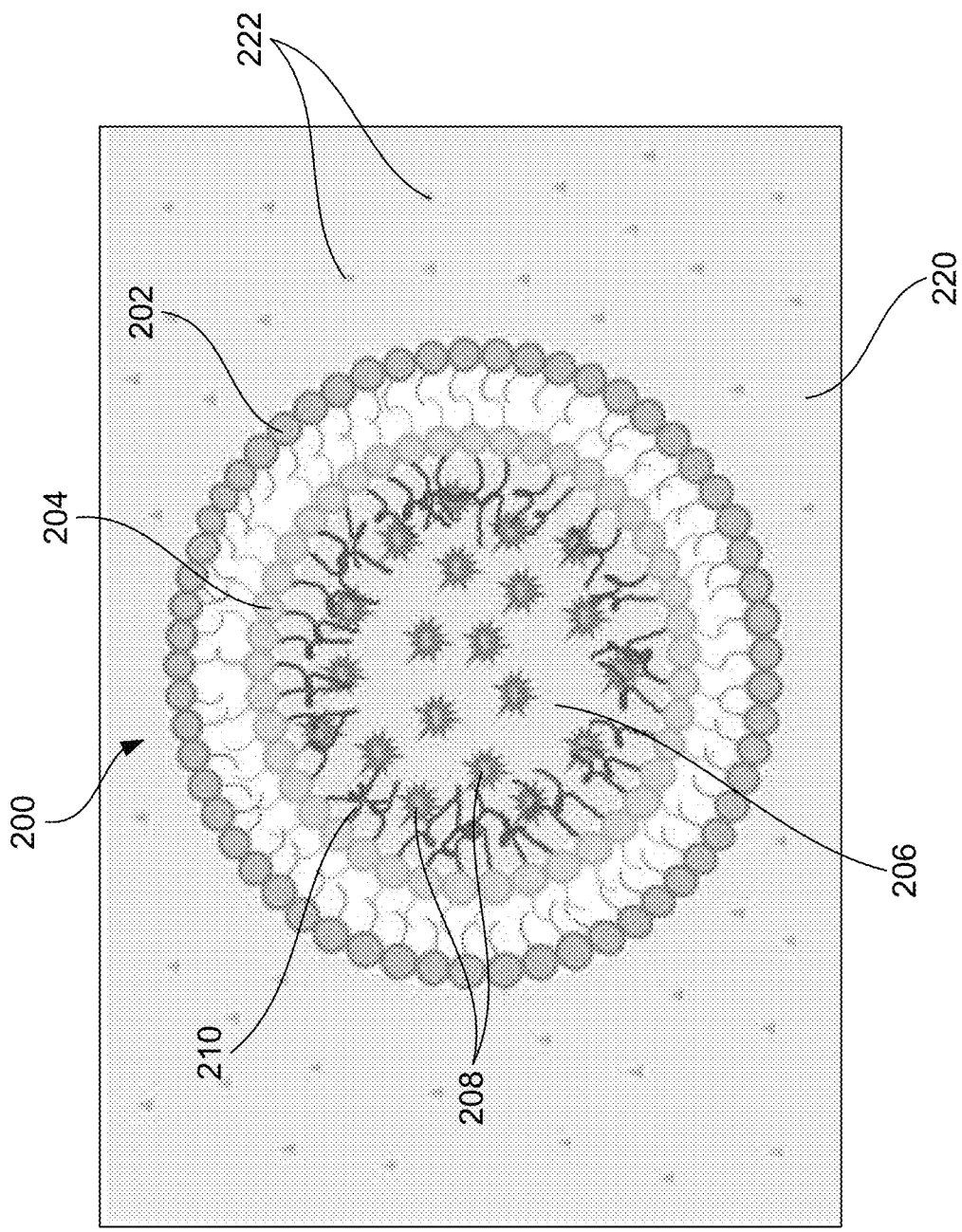
FIG. 2 illustrates a cross-sectional view of a liposome formed with the combination of materials of a polymer system, in accordance with one or more embodiments.

When combined in an aqueous dispersion, one or more of the various materials described may form beneficial agents or carriers, such as liposomes and ultraflexible vesicles, such as transfersomes, which can help transport the active ingredients, such as botanical extracts, into and through the SC layer of the skin. FIG. 2 shows a cross-sectional view of a liposome 200 formed with the described materials of polymer system 110, according to one or more embodiments.

As shown in FIG. 2, liposome 200 is formed of a lipid bilayer comprising external layer 202 and internal layer 204, which defines a hydrophilic core of the lipsome. Various active ingredients 208, such as botanical extracts, may be contained within the hydrophilic core of the liposome. In an example embodiment, active ingredient 208 comprises Aloe vera extracts.

Initially, a hydrophilic humectant 206, such as glycerol, may be blended in water with Aloe vera, which may then help bind the water molecules that are attracted by the humectant to the skin. Various other polyols may be used as the hydrophilic humectant. Once humectant 206 and active ingredients 208 have been solubilized, a surface active agent 210 or surfactant, such as polysorbate 80, may then be added to the mixture to bind to humectant 206, which contains the Aloe vera to the internal layer 204 of the liposome. The addition of surface active agent 210 may form micelle structures with molecules of surface active agent 210 surrounding a hydrophilic core of humectant 206 and active ingredients 208.

A hydrophobic occlusive agent and a hydrophobic emollient agent may then be added to the mixture, which may bind to the micelles to form liposomes 200, each liposome 200 comprising a lipid bilayer surrounding a micelle. Transfersomes are structures similar to liposomes 200 with smaller particle sizes, and may also be formed with the addition of the occlusive agent and emollient agent. In some embodiments, the emollient agent is a lipid dispersion, such as a carnauba wax dispersion. In some embodiments, the occlusive agent is a silicone copolymer, such as a siloxane or dimethicone. In various embodiments, molecules of the emollient agent may bind more strongly to molecules of the surface active agent 210 than the molecules of the occlusive agent. Therefore, inner layer 204 of the lipid bilayer may comprise mainly of the emollient agent and outer layer 202 of the lipid bilayer may comprise mainly of the occlusive agent. Interaction between the surface active agent and the lipid bilayer may further stabilize the structure of the beneficial agent.

Additional water may then be added to the mixture containing the liposomes and transfersomes to form an aqueous dispersion of polymer system 110 that comprises the beneficial agents and carriers within a continuous aqueous phase 220. In some embodiments, lubricant 222 is included in the water-based dispersion. For example, lubricant 222 may be a PAG based lubricant, such as UCON 50 HB 5100. As previously described, lubricant 222 may introduce different surface energies at the interface between the continuous aqueous phase and the liposome and transfersome vesicles. Lubricant 222 may also improve the polymer dispersion on the substrate surface and ensure an even coating of polymer system 110 onto the glove substrate.

Once adequately coated, the coating of polymer system 110 on the glove substrate may be dried prior to being worn and put in contact with the user's skin. When in contact with the skin, the lipid bilayer of liposomes and transfersomes can aggregate, fuse, and attach to the lamellar layer of the stratum corneum, reversibly modifying its network structure and allowing the active ingredients, such as Aloe vera extracts, to penetrate deeper into the epidermis. Transfersomes have ultradeformable properties that are able to overcome the barrier obstacles of the stratum corneum. The transfersome facilitates movement against the osmotic gradient of the skin is generated by the difference in total water concentration between the skin surface (15-30% water) and lower epidermis (70% water). The addition of edge activators in transfersomes also improves the delivery of encapsulated agents into the intact skin by increasing the flexibility of the vesicles. The structural rearrangement of surfactant molecule, which is produced by evaporation of the aqueous phase after topical application and drying of the vesicles, reduces the energy required for deformation of the vesicles. Hence transfersomes may squeeze through the intercellular pathway of the stratum corneum under the influence of osmotic gradient in the skin.

Upon fusing with the SC layer of the skin, the lipid bilayer of the beneficial agents break apart releasing the humectant and other active ingredients into the epidermis. The occlusive agent of the lipid bilayer may form a hydrophobic barrier over the SC layer to prevent water loss, and the emollient agent of the lipid bilayer may penetrate deeper into the epidermis to form a barrier deeper within the epidermis, or between the dermis and epidermis, thereby securing the active ingredient and humectant within the dermis and epidermis. There, an active ingredient, such as Aloe vera may bind the water carried by the humectant to the skin cells, in addition to other beneficial effects previously described. The hydrophilic humectant may also help draw water from the dermis to the epidermis for further hydration.

Surfactants are generally capable of interacting with both water transporting proteins and intercellular lipids in the stratum corneum. By penetrating through this layer, surfactants are also able to affect living cells in deeper regions of the skin (dermal tissues). Polysorbate 80, in particular, is a non-cytotoxic surfactant capable of physically adhering itself to the dermal tissue. In this case, the hydrophobic part of the polysorbate 80 surfactant may remain attached to the emollient agent, while the hydrophilic part will attach to the dermis. Due to higher attractive forces, the hydrophilic humectants and active ingredients would preferentially stay in the dermal layer.

Various other materials may be included in polymer system 110. In some embodiments, polymer system 110 may further comprise various components that function as a desquamation stimulator and/or an exfoliant including, without limitation, glycerol, urea, citric acid, and malic acid. Accumulation of corneocytes on the skin surface may decrease the moisture level of the skin. Desquamation causes the loss of corneocytes from the skin surface thereby improving skin moisture levels. Exfoliants remove dead skin cells from the outermost layer of the epidermis and promote cell renewal process, providing smooth and radiant appearance of skin. Glycerol may also function as a desquamation stimulator and exfoliant by stimulating the desmosome digestion and increasing the activity of desquamatory enzymes to reduce the dry and flaky appearance of a xerotic stratum corneum. Urea is a keratolytic agent that can dissolve the intercellular matrix of the stratum corneum and disrupt epidermal proteins by forming hydrogen bonds between them, hence promoting desquamation. Citric acid may stimulate cell renewal processes and decrease the dry scales formed on the skin surface, thereby enhancing skin moisturization.

In various embodiments, donning agents may be included in polymer system 110 to reduce friction against skin and improve the donning characteristics of the elastomeric glove or article. In some embodiments, polymer system 110 may include ammonium alkyl phosphate (DARVAN L) as a dry donning agent. Dimethicone (such as in the form of DOW-SIL HMW 2220, DOWSIL 3901, or DOWSIL 7-3100) may also serve as a donning agent. As such, gloves coated with the novel polymer system 110 allow the glove to be donned, or applied to the user's hand, quickly and conveniently in both wet and dry conditions without the need for powders, while preventing glove damage and reducing donning time. Thus, in a medical healthcare environment, the described coating of polymer system 110 and gloves reduce usage costs from damaged gloves, enhance user productivity, increase safety through the proper fitting of examination gloves, and allow for improved compliance with hand-hygiene and safety protocols.

In various embodiments, organic solvents may be included to aid the control of the rheological properties of polymer system 110 as well as promoting adhesion to the substrate. Furthermore, organic solvents may improve manufacturing efficiency further by promoting faster drying of the coating. Organic solvents may include 2-propanol and ethanol.

Various preservatives may also be included in polymer system 110 for antimicrobial properties, and may be added to maintain the microbiological safety of the elastomeric article by inhibiting the growth of and reducing the amount of microbial contaminants. In some embodiments, phenoxyethanol may be used as a preservative. In some embodiments, the preservatives may include a combination of *Scutellaria baicalensis* root extract, lactobacillus ferment, glycerol, *Glycyrrhiza uralensis* root extract, and *Cordyceps militaris mycellium* extract (BHC-C). In some embodiments, the preservatives may include a combination of lactobacillus/wasabi japonica root ferment extract, *Brassica oleracea italica* extract, and glycerol (WFEC). In some embodiments, the preservatives may include a combination of phenoxyethanol, benzoic acid, dehydroacetic acid, and ethylhexylglycerin (Sensicare C 1042). In some embodiments, the preservatives may include a combination of sodium benzoate and potassium sorbate (Sensicare C 2010). In some embodiments, one or more biocides are added to polymer system 110 to control the bioburden level. In particular embodiments, the biocide used can be bronopol ($C_3H_6BrNO_4$), or other similar biocides.

Example Formulations

In an example embodiment, polymer system 110 may include Aloe vera, glycerol, polysorbate 80, a polyalkylene glycol (PAG), dimethicone dispersion, and a carnauba wax dispersion in the purity and percentage ranges shown in Table 1 below:

TABLE 1

Polymer system 110 formulation (Formulation 1)

| Material | Purity (% w/w) | Dosage Range (% w/w) | Example Dosage of Formulation 1 (% w/w) |
|---|---|---|---|
| Botanical extract (Aloe Vera) | 100 | 0.05-1.00 | 0.20 |
| Glycerol | 98 | 0.10-3.00 | 0.30 |
| Polysorbate 80 | 100 | 0.05-0.50 | 0.10 |
| Polyalkylene glycol (PAG) | 100 | 0.05-0.50 | 0.10 |
| Dimethicone dispersion | 60 | 0.05-2.00 | 0.10 |
| Carnauba wax dispersion | 25 | 0.05-2.00 | 0.20 |

In various embodiments, polymer system 110 may be prepared from a water-based dispersion of an emulsion of the selected materials, at approximately 0.8% to 1.2% w/w total solids content (TSC). The emulsion dispersion of polymer system 110 may have a pH of 4.9 to 5.2, a surface tension of 36 to 39 N/m and a viscosity of 10 seconds as measured by a Ford cup (cup No. 4) or a Brookfield viscosity of 23 centipoise (at 20 revolutions per minute (rpm)), 13 centipoise (at 40 rpm) and 9 centipoise (at 60 rpm). As shown in Table 1, an example aqueous dispersion of polymer system 110 may include Aloe vera extract in a range of 0.05% weight by weight (w/w) to 1.00% w/w. The aqueous dispersion may further include glycerol in a range of 0.10% w/w to 3.00% w/w. The aqueous dispersion may further include polysorbate 80 as a surfactant in a range of 0.05% w/w to 0.50% w/w. The aqueous dispersion may further include a polyalkylene glycol (PAG) based lubricant at a range of 0.05% w/w to 0.50% w/w. The aqueous dispersion may further include dimethicone dispersion at a range of 0.05% w/w to 2.00% w/w. The aqueous dispersion may further include a carnauba wax dispersion at a range of 0.05% w/w to 2.00% w/w. However, other example polymer system 110 formulations may include fewer selected materials than shown in Table 1. In some embodiments, additional materials described herein may be included in the final polymer system formulation.

Table 1 also shows an example Formulation 1 of polymer system 110 which includes an aqueous dispersion of Aloe vera at 0.20% w/w, glycerol at 0.30% w/w, polysorbate 80 at 0.10% w/w, PAG at 0.10% w/w, dimethicone dispersion at 0.10% w/w, and a carnauba wax dispersion at 0.20% w/w. The relative content of glycerol, the carnauba wax dispersion, and the silicone copolymer in polymer system 110 may improve the binding and retention of moisture on and within the skin layers.

The selected materials may be supplied at various purities. For example, Aloe vera may be supplied at purity of 100% w/w. Aloe vera may be provided in gel or powder form. Glycerol may be provided with a purity of 98% w/w. Polysorbate 80 may be provided at a purity of 100% w/w. In an example embodiment, PAG may be provided as UCON 50HB 5100 at a purity of 100% w/w. Dimethicone may be provided as a dispersion at a purity of 60% w/w. In an example embodiment, the dimethicone dispersion may be provided as DOWSIL HMW 2220. Carnauba wax may be provided as a dispersion of carnauba wax at a purity of 25% w/w. In an example embodiment, the carnauba wax dispersion may be provided as MICHEM LUBE 156. However, it should be understood that the various materials may be supplied at different purity levels and that dosage amounts may be varied accordingly to achieve desired concentrations and resulting properties of polymer system 110.

In example embodiments, the dilute aqueous dispersion of polymer system 110 may then be applied to the non-chlorinated or lightly chlorinated interior surface of a rubber glove during its manufacture using coagulant dipping. For example, the surface of the glove may be exposed to chlorination levels between 0 parts per million (ppm) to 600 ppm, inclusive. However, in some embodiments, the surface of the glove may be exposed to chlorination levels above 600 ppm. For example, the surface of the glove may be exposed to chlorination levels of up to 1200 ppm in certain embodiments.

Polymer system 110 can be most readily applied by dipping of the glove, while still on the glove mold, into a dilute aqueous dispersion of polymer system 110. The aqueous dispersion may be maintained at about 45-55° C. during this online process. In some embodiments, the dipping may be performed directly after curing of the glove and post cure leaching, and prior to a final drying step, e.g., before the gloves are stripped from the molds and inverted during that same process. Alternatively, in some embodiments, polymer system 110 may be applied by spraying or other coating techniques at various stages of the coagulant dipping process or off line, such as by wet tumbling. For example, formed gloves may be removed from the molds, but not inverted such that the interior surface is exposed. The gloves may then be tumbled with a water-based dispersion of polymer system 110 until the interior surface is sufficiently coated with polymer system 110. In some embodiments, the same or similar concentration of water-based dispersions of polymer system 110 may be used for the different application techniques. However, different suitable concentrations of such water-based dispersions may be used as required by the specific application technique.

In various embodiments, the amount of polymer system 110 included may range from 0.8 grams to 1.2 grams per glove on a wet basis. After drying, the amount of polymer system 110 included ranges from between 0.1 grams and 0.3 grams per glove on a dry basis. However, in various embodiments each glove may have 0.1 grams or below of the coating material (on a dry basis). In other embodiments, each glove may receive 0.3 grams or more of the coating material (on a dry basis). If too little of the coating material is applied, hydrating properties of the glove, as well as donning properties, may not be sufficiently improved. If excessive material is used the eventual interior surface of the glove becomes shiny and has tendency to stick to itself, which is undesirable.

Glove Substrate

Polymer system 110 may be applied to various elastomeric articles and substrates. In an example embodiment, elastomeric gloves are coated with polymer system 110. As previously described, such elastomeric gloves may be manufactured from a range of elastomers such as synthetic rubber latex compositions. In some embodiments, the rubber latex composition may eliminate the presence of sulphur or other conventional accelerators, which will further maintain skin health by reducing the potential for dermatitis and allergic reactions.

According to various embodiments, a synthetic rubber latex composition comprises a synthetic rubber latex, or blend thereof, combined with various metal oxides including zinc, magnesium and aluminum and other mono-, bi- and poly-functional materials as well as various process materials blended or mixed synergistically in water. In various embodiments, the synthetic rubber latex, or blend thereof, is provided as a water-based mix. Example synthetic rubber latexes may include nitrile latex, polychloroprene latex, polyisoprene latex, styrene butadiene latices, acrylic latices, latices of styrene butadiene copolymers and block copolymers, polyurethane elastomer dispersions, and mixtures of the same. Some suitable synthetic rubber latex examples include NANTEX 660 from Nantex Ind. Co., Ltd, SYNTHOMER 6338 from Synthomer Sdn Bhd, POLYLAC 580N from Shin Foong, SD671A from Showa Denko, LM61 from Denka, NIPOL LX550L & NIPOL LX430 from Zeon Corp., CARIFLEX IR0401 from Kraton Corp., BSTS IRL501 & 701 from BST Specialty, and various blends of these examples. In some embodiments, other common rubber compounding and process materials such as waxes, clays, anionic and non-ionic surfactants, dispersants, and the like may also be added to the formulation.

An example formulation (Formulation 2) for mixing with a synthetic rubber latex may include the materials in the ranges shown below in Table 2, with all levels listed in approximate parts per 100 parts of dry rubber (PHR):

TABLE 2

Example substrate formulation (Formulation 2)

| Material | Amount (PHR) |
| --- | --- |
| Synthetic Rubber Latex (or blend thereof) | 100 |
| Metal Oxides (e.g. zinc oxide, aluminum oxide) | 0.25 to 4.5 |
| Mono-, bi-, or poly-functional materials (e.g. polycarbodiimide) | 0 to 2.5 |
| Potassium Hydroxide (for pH adjustment) or ammonium hydroxide | 0.5 to 2.0 |
| Titanium Dioxide | 0 to 3.5 |
| Color Pigment | 0 to 0.55 |

In some embodiments, an organic ionic liquid may be included in the formulation that is blended with the synthetic rubber latex. In various embodiments, the water-based mix of synthetic rubber latex, or blend thereof, is compounded with the ionic liquid formulation after a surfactant is added to the ionic liquid formulation. In some embodiments, the formulation includes the ionic liquid at 0.05 to 1.5 PHR. In some embodiments, the organic ionic liquid comprises one or more alkyl imidazole ionic salts such as 1-Butylimidazole, 1-Methylimidazole, 1-Hexylimidazole, and Bromo-1-imidazole.

The metal oxides in the substrate formulation may be any one or more of zinc oxide, magnesium oxide, cadmium oxide, aluminum oxide, and the like. As used herein, the term "functional materials" refers to compounds and other materials that include one or more crosslinkable groups. The functional (monofunctional, bifunctional or polyfunctional) materials in the substrate formulation may be any one or more of polycarbodiimides, arzidines, epoxies, and the like. The substrate formulation may further comprise a combination of one or more process materials known in the art including surfactants, dispersants, opacity agents, waxes, clays, antioxidants, fillers such as calcium carbonate and aluminum silicates.

Of particular advantage, elastomeric gloves can be formed from the described compositions without using conventional sulphur and accelerators resulting in several improvements over existing elastomeric gloves. First, the risk of allergic reactions and dermatitis caused by such chemical additives is reduced. Furthermore, rubbers (synthetic and natural) which comprise sulphur-containing crosslinking agents and accelerators typically have to be vulcanized at temperatures greater than about 130° C. However, a synthetic rubber latex glove manufactured with the described compositions can be cured at temperatures less than about 130° C. reducing energy consumption and production costs. In some embodiments, rubber latex comprising the described compositions can be sufficiently cured at temperatures less than 120° C., and more particularly at temperatures less than 110° C.

With the use of the described organic ionic liquids, the described synthetic rubber latex compositions may proceed with various crosslinking routes to strengthen the rubber, but with much lower metal oxide levels (<1.2 PHR) and without the need for sulphur and traditional vulcanization agents and accelerators, thereby reducing materials costs, as well as eliminating potential allergens in the final product. When combined with the hydrating effects of the described polymer system 110, this further contributes to the health of the user's skin by lowering the dermatitis potential and maintaining an appropriate pH of the skin. Use of such synthetic rubber latex can also help to avoid allergenic response issues associated with latex-proteins.

The particular properties arise, at least in part, from the nature of the ionic liquid and how it combines synergistically with the other materials as well as its efficient interaction with available crosslinking sites within the synthetic rubber's carbon chain or backbone. Ionic liquids are a class of purely ionic salt-like materials in liquid form comprising organic cations (such as imidazolium, ammonium, pyrrolidinium, piperidinium, phosphonium and sulfonium) associated with inorganic anions (Cl—, AlC14-, PF6-, BF4-, NTf2-, DCA-, etc.) or organic anions (CH3COO—, CH3SO3-, etc.). As previously described, the organic ionic liquid may comprise alkyl imidazole ionic salts including one or more of the following: 1-Butylimidazole, 1-Methylimidazole, 1-Hexylimidazole and Bromo-1-imidazole. In certain embodiments, the organic ionic liquid comprises 1-Butylimidazole as the alkyl imidazole ionic salt.

The elastomeric glove substrate may be chlorinated or unchlorinated in different embodiments. Typically, chlorination levels of 400 to 1200 ppm (as based on free chlorine) are routinely used in the industry. However, in some embodiments, the interior surface may be non-chlorinated or exposed to chlorination levels under 600 parts per million (ppm), which reduces corrosion or weakening of the finished elastomeric article caused by higher levels of chlorination.

In some embodiments, the particular chlorination process of various elastomeric gloves may result in the added benefit of formation of micro cracks or channels on the chlorinated surface of the glove. Such channels may vary in size. In some embodiments, the channels are approximately 10 microns or less in width. These channels may serve as a template for polymer system 110 and coating which improves the retention of polymer system 110 onto the interior surface of the glove. The channels also allow a gradual release of the hydrating coating from the channels to the user's skin resulting in an increased hydration effect. The gradual release occurs because the retained polymer system 110 within the channels may release more slowly compared to if the coating has no channels to be retained in.

Improved Hydrating Characteristics

The use of gloves coated with the described polymer system 110 result in significantly increased hydrating effect of normal human skin when compared to non-use of the glove, as well as to other gloves that do not use polymer system 110. The hydrating characteristics and other beneficial effects of gloves coated with the example polymer system 110 were tested and shown to provide improved hydrating effects on skin, as well as maintenance of healthy skin pH.

In Experiment 1, the mean degree of skin hydration at various time intervals were tested for 3.5 gram nitrile gloves comprising a substrate that was free of powder, sulphur, and accelerators (Formulation 2), with the interior surface coated with the described polymer system 110 (Formulation 1). 20 subjects wore the coated gloves on the right hand for 2 hours every day for 12 consecutive days. In order to mimic condition of use, the gloves were changed at 30 minute intervals during the 2 hour use period. A 1.5 $cm^2$ "test glove area" (TGA) of the dorsal surface of the right hand was identified as the test area and baseline hydration levels were measured using a corneometer prior to any glove usage (T0) after the subjects' hands had adapted to the temperature and humidity of the room for 30 minutes. Hydration levels were then tested after 2 hours of glove usage on Day (T1), after 2 hours of glove usage on Day 5 (T2), and after 2 hours of glove usage on Day 12 (T3).

No glove was used on the left hand and a 1.5 cm2 "non-glove area" (NGA) of the dorsal surface of the left hand was measured for hydration levels at the same intervals. Another 1.5 $cm^2$ area of each hand was also identified and subjected to treatment of 0.5% sodium lauryl sulfate (SLS) for 30 minutes every day during the test period to simulate drying or irritation, such as that experienced by healthcare personnel from frequent hand washing and sanitization. Thus, Experiment 1 measured hydration levels at an SLS-treated TGA, an SLS-free TGA, an SLS-treated NGA, and an SLS-free NGA.

The moisturizing efficacy of the coated glove was assessed based on the improvement of degree of skin hydration. The corneometer measurements indicate the hydration measure of superficial layers of the skin (stratum corneum) via measurement of skin dielectric capabilities. The results of Experiment 1 are shown in Table 3A which indicates the mean percentage increase of measured skin hydration values at the various time intervals compared to the baseline hydration levels for the test glove areas and non-glove areas.

TABLE 3A

Experiment 1
Mean percentage increase of measured skin hydration values

|  |  | T1 (Day 1) | | T2 (Day 5) | | T3 (Day 12) | |
| --- | --- | --- | --- | --- | --- | --- | --- |
|  |  | SLS Free | SLS Treated | SLS Free | SLS Treated | SLS Free | SLS Treated |
| Test Glove Area (TGA) | Mean of skin hydration (%) increase ± SD | 10.603 ± 12.097 | 4.189 ± 14.436 | 19.716 ± 24.657 | 11.724 ± 22.253 | 18.951 ± 26.724 | 8.155 ± 24.897 |
|  | Paired T-test, p-value (compared to respective baseline) | 0.001* | 0.210 | 0.002* | 0.029* | 0.005* | 0.159 |
|  | Paired T-test, p-value (SLS Free vs. SLS treated) | 0.047* | | 0.026* | | 0.018* | |
| Non-Glove Area (NGA) | Mean of skin hydration (%) increase ± SD | 5.184 ± 11.183 | 1.288 ± 9.398 | 7.181 ± 15.816 | 5.648 ± 27.721 | 4.407 ± 18.471 | 7.426 ± 23.062 |
|  | Paired T-test, p-value (compared to respective baseline) | 0.052 | 0.547 | 0.057 | 0.374 | 0.299 | 0.166 |
|  | Paired T-test, p-value (SLS Free vs. SLS treated) | 0.072 | | 0.782 | | 0.565 | |
| T-test of skin hydration (%) increase, p- value (TG vs NGA) |  | 0.088 | 0.304 | 0.006* | 0.315 | 0.013* | 0.919 |

As shown in Table 3A, there was significant improvement in the degree of skin hydration of the test glove area after usage of test glove for 2 hours on Day 1 (T1) with a mean of 10.603±12.097 percent increased hydration (p=0.001*), after usage of test glove for 2 hours on Day 5 (T2) with a mean of 19.716±24.657 percent increased hydration (p='0.002*), and after usage of test glove for 2 hours on Day 12 (T3) with a mean of 18.951±26.724 percent increased hydration (p=0.005*) when compared to baseline. There was no significant improvement in the degree of skin hydration of the non-glove area of the skin when compared to baseline throughout the study.

The amount of hydration between the SLS-free areas of the TGA and the NGA were compared. The SLS-free area of the NGA serves as a positive control for normal skin conditions. The results show that improvement of the degree of hydration of the SLS-free TGA was better than the SLS-free NGA and the difference was statistically significant after usage of the test glove at T2 (p=0.006*) and at T3 (p=0.013*). However, there was no significant change in the degree of hydration of the skin between the SLS-treated TGA and the SLS-treated NGA.

The SLS treatment was performed to induce skin irritation in the respective test areas, which can potentially minimize the hydration effect of a tested formula. This serves as a negative control of abnormal or irritated skin. The results also indicate that there was a statistically significant improvement in the degree of hydration of the SLS-free TGA as compared to the SLS-treated TGA across all subjects. Administration of SLS did reduce the moisturizing effects of the test glove, and resulted in no significant increase in hydration in the SLS-treated TGA, except on T2. There was no significant difference between the SLS-free NGA and the SLS-treated NGA across all subjects.

Additional results of Experiment 1 are shown in Table 3B which indicates the mean value of measured skin hydration and standard deviation (SD) across all test subjects at the various time intervals.

TABLE 3B

Experiment 1
Mean value of skin hydration at TGA and NGA in arbitrary units (AU)

|  | T0 (Day 0) | | T1 (Day 1) | | T2 (Day 5) | | T3 (Day 12) | |
| --- | --- | --- | --- | --- | --- | --- | --- | --- |
|  | SLS Free | SLS Treated | SLS Free | SLS Treated | SLS Free | SLS Treated | SLS Free | SLS Treated |
| Test Glove Area (TGA) | 37.198 ± 9.205 | 35.578 ± 8.552 | 40.423 ± 7.825 | 36.578 ± 8.117 | 43.405 ± 9.018 | 38.737 ± 7.799 | 42.911 ± 10.058 | 37.772 ± 10.399 |
| Percentage increase from baseline T0 (%) |  |  | 8.67 | 2.81 | 16.69 | 8.88 | 15.36 | 6.17 |

TABLE 3B-continued

Experiment 1
Mean value of skin hydration at TGA and NGA in arbitrary units (AU)

|  | T0 (Day 0) | | T1 (Day 1) | | T2 (Day 5) | | T3 (Day 12) | |
| --- | --- | --- | --- | --- | --- | --- | --- | --- |
|  | SLS Free | SLS Treated | SLS Free | SLS Treated | SLS Free | SLS Treated | SLS Free | SLS Treated |
| Non-Glove Area (NGA) | 37.061 ± 8.623 | 32.883 ± 8.933 Percentage increase from baseline T0 (%) | 38.787 ± 8.552 4.66 | 33.097 ± 8.744 0.65 | 39.460 ± 9.848 6.47 | 33.923 ± 9.590 3.16 | 38.225 ± 9.238 3.14 | 34.650 ± 9.550 5.37 |

The results in Table 3B indicate that there was a 15.36% increase in the mean of the measured hydration values of the test subjects at T3 from the baseline (T0) at the SLS-free TGA. There was only a 3.14% increase in the mean of the measured hydration values of the test subjects at T3 from the baseline (T0) at the SLS-free NGA. This is an approximately 390% improvement in hydration percentage increase resulting from gloves coated with Formulation 1 for normal skin conditions. Based on similar testing, existing gloves currently available on the market (gloves A, B, and C) provided significantly lower improvements in hydration percentage increases: glove A (207.00%), glove B (54.00%), glove C (106.06%), respectively.

As such, usage of gloves coated with the described polymer system 110 resulted in significant increases in moisturizing effect of human skin when compared to baseline and when compared to the non-glove area.

To further elucidate on the hydrating benefits of the described polymer system 110, described herein are the results of a double blind perception study. In the user perception study, test gloves coated with the described polymer system 110 were tested against control gloves among subjects, who were instructed to wear gloves on both hands for 1 hour and then asked to evaluate various properties and effects of the gloves in a survey. As in Experiment 1, the test gloves comprised 3.5 gram nitrile gloves that were free of powder, sulphur, and accelerators, with the interior surface coated with the described polymer system 110 (Formulation 1). The control gloves were equivalent 3.5 gram nitrile gloves as the test gloves, but without any coating on the interior surface.

The results of the user double blind perception study are shown in Table 4 below.

TABLE 4

| | User Perception Study | | | | | |
| --- | --- | --- | --- | --- | --- | --- |
| | Test Glove | | | Control Glove | | |
| Parameter | Strongly Disagree (%) | Neutral (%) | Strongly Agree (%) | Strongly Disagree (%) | Neutral (%) | Strongly Agree (%) |
| Skin Moisture or Softness Feel After Wearing Glove | 3 | 38 | 59 | 31 | 41 | 28 |
| Glove Smoothness/ Sliding Property | 3 | 28 | 69 | 24 | 31 | 45 |
| Abduction or Extension Dexterity | 0 | 17 | 83 | 16 | 42 | 42 |
| Ease of Donning | 7 | 10 | 83 | 24 | 35 | 41 |
| Easy of Doffing | 0 | 28 | 72 | 7 | 43 | 50 |

As shown in Table 4, 59% percent of subjects reported feeling more moisture and softer skin after wearing the test glove, compared to 28% for the control glove. Additionally, a larger percentage of subjects reported better glove smoothness, abduction or extension dexterity, and ease of donning and doffing (glove removal) as compared to the control glove.

Low Potential of Dermatitis and Sensitization

The described gloves coated with polymer system 110 also have low dermatitis potential and demonstrates reduced potential for sensitizing users to chemical additives. In Experiment 2, a modified Draize-95 test was performed for gloves with the interior surface coated with the described polymer system 110 (Formulation 1). There are three distinctive types of adverse reactions to rubber that differ in their mechanisms of induction and resulting clinical manifestations. These reactions include irritation, delayed hypersensitivity (Type IV allergy), and immediate hypersensitivity (Type I allergy). Type IV allergy is a cell-mediated immunological reaction resulting in allergic contact dermatitis that develops 1 to 4 days after the exposure, and is predominantly induced by residual chemical additives on the finished rubber article, such as gloves. Type IV allergic reactions to rubber containing articles represent serious problems as the exposure of sensitized individuals to rubber articles can cause health problems and significantly affect user performance in a medical setting.

Experiment 2 evaluated whether the coated gloves would induce Type IV allergies in an unsensitized user population. In Experiment 2, the inner surface (coated with Formulation 1) and the outer surface (not coated with Formulation 1) of the gloves were tested on the skin of human subjects and included a first induction phase and a second challenge phase. Table 5 shows the results of Experiment 2 for 210 test subjects.

During the induction phase, samples of the test material (both the inner and outer surface with minimum size of 2 cm by 2 cm each) were applied to each test subject in the study. A total of ten patches of test material were patched or secured on the upper back area of the hand of each test subject over a period of 3 weeks. The induction phase of the test includes application of ten patches of test material on each Monday, Wednesday, and Saturday. The test material was removed and replaced with a new one at the same site every 48 hours for a total of ten changes. Patches applied on Saturday were removed on Monday. Control materials were applied in a similar manner. Control materials included filter paper and a control glove. The control glove was an uncoated textured, powder free natural rubber latex glove with a low level of accelerators.

After a rest period of 2 to 3 weeks, with no further test material or control materials applied to the test subjects, challenge materials were applied during the challenge phase. During the challenge phase, the same test materials (both inner surface and outer surface) were applied consecutively to a virgin site for 48 hours each. The test sites were then evaluated for reaction at the time of each patch removal and again 2 to 4 days after removal of the second patch.

During both the induction and challenge phases, the test areas of the subjects were scored based on standard scoring of the North American Contact Dermatitis Research Group (NACDRG) (Am. J. Contact Dermatitis" 2: 122-129, 1991). A basic score of 0 was given for "no visible reaction," a basic score of 0.5 was given for "doubtful or negligible erythema reaction," a basic score of 1.0 was given for "mild or just perceptible macular erythema reaction in a speckled/ follicular, patch, or confluent pattern (slight pinking)," a basic score of 2.0 was given for "moderate erythema reaction in a confluent pattern (definite redness)," and a basic score of 3.0 was given for "strong or brisk erythema reaction that may spread beyond the test site." A supplemental score of 0.5 was also added to the basic score for each of listed signs (edema, papules, vesicles, and bullae), if the reactions included the described signs. The final score is the sum of the basic and supplemental score values. Individuals who were identified as presensitized to rubber chemicals during the induction phase, or presenting as irritant reactions, were excluded from the statistical evaluation.

Based on these scoring criteria, all subjects completing the study should exhibit a score value of no more than 1.5 based on the scoring criteria described above in order to satisfy the claim of reduced sensitization potential for the coated gloves. The summary of results for Experiment 2 are shown in Table 5 below:

TABLE 5

Experiment 2
Modified Driaze-95 Test

| | | Number of subjects |
|---|---|---|
| Test Material - inner surface | Score less than 1.5 | 207 |
| | Score more than 1.5 | 0 |
| | Discontinued subjects | 3 |
| Test Material - outer surface | Score less than 1.5 | 206 |
| | Score more than 1.5 | 0 |
| | Discontinued subjects | 4 |
| Control Item 1 - textured, powder free latex gloves | Score less than 1.5 | 206 |
| | Score more than 1.5 | 0 |
| | Discontinued subjects | 4 |
| Control item 2 - filter paper | Score less than 1.5 | 206 |
| | Score more than 1.5 | 0 |
| | Discontinued subjects | 4 |

For the inner surface of the test material, 3 subjects were discontinued (2 subjects identified as presensitized during the induction phase, and 1 subject due to poor compliance). For the outer surface of the test material and the control items, 4 subjects were discontinued (3 subjects identified as presensitized during the induction phase, and 1 subject due to poor compliance). As shown in Table 5, none of the subjects had a final score of more than 1.5 during the induction phase and the challenge phase for both test materials and for both control items. As such, Experiment 2 shows that there was no clinical evidence of the presence of residual chemical additives in gloves coated with Formulation 1 that would induce type IV allergies in an unsensitized user population and may be classified as low dermatitis potential.

Method of Manufacture

Figure 3:
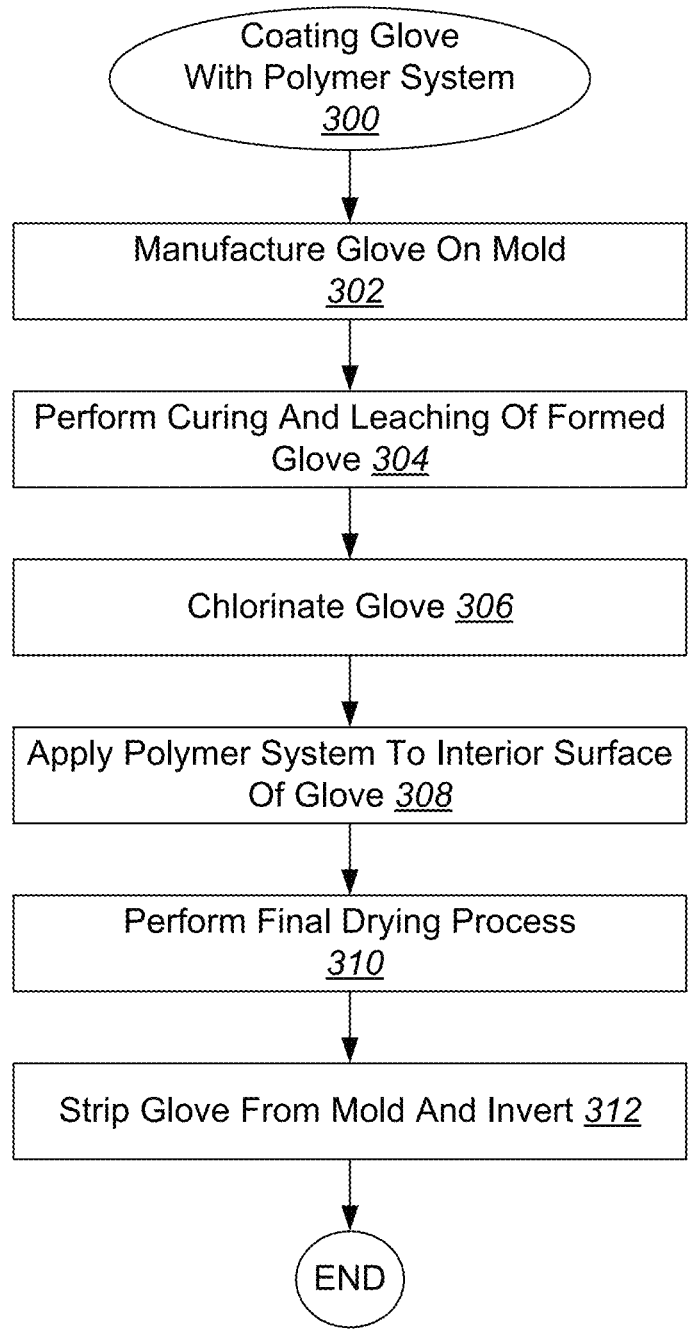
FIG. 3 illustrates an example method for coating a glove with a polymer system, in accordance with one or more embodiments.

FIG. 3 shows an example method 300 for coating a glove with a polymer system 110, in accordance with one or more embodiments. At 302, a glove substrate is manufactured on a mold or anatomic former. As previously described, an elastomeric rubber glove may be manufactured from various elastomers using various existing single or multiple coagulant dipping processes. Once the glove is formed by the manufacturing process of 302, the formed glove may be cured and leached at 304 to convert the glove into an elastic state and remove any residual chemicals and surfactant. The processes of 304 may be performed by various existing glove manufacturing processes which should be understood by persons of ordinary skill in the art.

In some embodiments, after post cure leaching in 304, the glove may be chlorinated at 306. In some embodiments, the interior surface of the glove includes chlorination levels of around 0 ppm to 600 ppm. As previously described, the chlorination process may result in the formation of micro channels on the interior surface that improve the retention of polymer system 110. Polymer system 110 is then applied to the interior surface of the glove at 308. In some embodiments, polymer system 110 is applied by dipping the interior surface into a dilute aqueous dispersion of polymer system 110. Alternatively, and/or additionally, polymer system 110 is applied by spraying polymer system 110 onto the interior surface or by wet tumbling, as previously described. Subsequently, a final drying process is performed at 310, and the glove is stripped from the mold and inverted at 312.

Off line wet tumbling application of polymer system 110 may be performed after the glove has been removed from the mold, but not inverted, such that the interior surface remains exposed. The glove may then be placed into a tumble oven. The water-based dispersion may then be applied by a fine spray while the gloves are tumbled for up to 10 to 15 minutes. The gloves may then continue to be tumbled at a predetermined temperature (such as 70 degrees Celsius) to dry the applied polymer system 110 coating. As another example, the glove may be placed into a large drum or barrel device with an appropriate quantity of the water-based dispersion. The drum is rolled to uniformly coat the gloves for up to 10 to 15 minutes. The gloves may then be removed and tumbled in an oven, such as a tumble oven at a predetermined temperature (such as 70 degrees Celsius) to dry the applied polymer system 110 coating. After the wet tumbling process, the gloves are removed from the oven and inverted such that the exterior surface is exposed. In some embodiments, polymer system 110 may be applied by a combination of one or more of the application techniques described.

In some embodiments, chlorination of the glove at 306 may be an optional step, and application of polymer system 110 may be performed directly after curing of the glove and post cure leaching and prior to a final drying step (310). Alternatively, in some embodiments, polymer system 110 may be applied by spraying or other coating techniques at various stages of the coagulant dipping during the manufacturing process of 302.

CONCLUSION

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A glove comprising:
a substrate, wherein the substrate is free of sulphur and accelerators; and
a polymer system that coats a surface of the substrate, wherein the polymer system comprises: a polyol, a botanical extract, an emollient agent, a silicone copolymer dispersion, a lubricant, and a surfactant, wherein:
the polymer system is formed in a liposome including an external layer and an inner layer,
the botanical extract is included in a core of the inner layer, and
the liposome comprises:
a mixture including the polyol blended with the botanical extract, and the surfactant,
micelle structures formed in the liposome using the surfactant,
the emollient agent and the silicone copolymer dispersion that are added to the mixture, and molecules of the emollient agent or the silicone copolymer dispersion are bound to the surfactant that is formed as micelle structures, and
an aqueous dispersion including the lubricant, the aqueous dispersion being outside of the external layer of the liposome.

2. The glove of claim 1, wherein the polymer system coats an interior surface of the substrate.

3. The glove of claim 1, wherein the polymer system is applied to the surface by dipping the surface into a water-based dispersion of the polymer system.

4. The glove of claim 3, wherein the botanical extract comprises a combination of one or more of the following: Aloe vera powder, Aloe vera gel, argan oil, shea oil, and chamomile oil.

5. The glove of claim 3, wherein the botanical extract comprises Aloe vera and is present in the water-based dispersion at a range of 0.05% to 1.00% w/w.

6. The glove of claim 3, wherein the polyol comprises glycerol, and wherein the polyol is present in the water-based dispersion at a range of 0.05% to 3.00% w/w.

7. The glove of claim 3, wherein the silicone copolymer dispersion comprises dimethicone, and wherein the silicone copolymer is present in the water-based dispersion at a range of 0.05% to 2.00% w/w.

8. The glove of claim 3, wherein the surfactant comprises polyoxyethylene (20) sorbitan monooleate, and wherein the surfactant is present in the water-based dispersion at a range of 0.05% to 0.50% w/w.

9. The glove of claim 3 wherein the lubricant comprises a polyalkylene glycol (PAG), and wherein the lubricant is present in the water-based dispersion at a range of 0.05% to 0.50% w/w.

10. The glove of claim 3, wherein the emollient agent comprises a carnauba wax dispersion, and wherein the emollient agent is present in the water-based dispersion at a range of 0.05% to 2.00% w/w.

11. The glove of claim 3, wherein the polymer system is blended into water at a total solids content of 0.8% to 1.2% w/w to form the water-based dispersion.

12. The glove of claim 1, wherein the surface is non-chlorinated or exposed to chlorination levels under 600 parts per million (ppm).

13. The glove of claim 1, wherein the polymer system is included in an amount between 0.1 grams and 0.3 grams on a dry basis.

14. The glove of claim 1, wherein the substrate is formed with channels that serve as a template for retention of the polymer system that coats the surface of the substrate.

15. A protective article comprising:
a substrate with a first surface, wherein the substrate is free of sulphur and accelerators; and
a polymer system coating the first surface, wherein the polymer system comprises: a polyol, a botanical extract, an emollient agent, a silicone copolymer dispersion, a lubricant, and a surfactant, wherein:
the polymer system is formed in a liposome including an external layer and an inner layer,
the botanical extract is included in a core of the inner layer, and
the liposome comprises:
a mixture including the polyol blended with the botanical extract, and the surfactant,
micelle structures formed in the liposome using the surfactant,
the emollient agent and the silicone copolymer dispersion that are added to the mixture, and molecules of the emollient agent or the silicone copolymer dispersion are bound to the surfactant that is formed as micelle structures, and
an aqueous dispersion including the lubricant, the aqueous dispersion being outside of the external layer of the liposome.

16. A method comprising:

forming an elastomeric rubber glove substrate on a mold, wherein the substrate is free of sulphur and accelerators; and applying a polymer system onto a surface of the elastomeric rubber glove, wherein the polymer system comprises: a polyol, a botanical extract, an emollient agent, a silicone copolymer dispersion, a lubricant, and a surfactant, wherein:

the polymer system is formed in a liposome including an external layer and an inner layer, the botanical extract is included in a core of the inner layer, and the liposome comprises:
- a mixture including the polyol blended with the botanical extract, and the surfactant,
- micelle structures formed in the liposome using the surfactant,
- the emollient agent and the silicone copolymer dispersion that are added to the mixture, and molecules of the emollient agent or the silicone copolymer dispersion are bound to the surfactant that is formed as micelle structures, and
- an aqueous dispersion including the lubricant, the aqueous dispersion being outside of the external layer of the liposome.

17. The method of claim 16, wherein applying the polymer system comprises dipping the surface into a dilute aqueous dispersion of the polymer system.

18. The method of claim 17, wherein the polymer system is blended into water at a total solids content of 0.8% to 1.2% w/w to form the aqueous dispersion.

19. The method of claim 16, wherein applying the polymer system comprises spraying a dilute aqueous solution of the polymer system onto the interior surface.

20. The method of claim 16, further comprising removing the elastomeric rubber glove substrate from the mold before applying the polymer system, wherein applying the polymer system comprises wet tumbling the elastomeric rubber glove substrate in a dilute aqueous dispersion of the polymer system.

21. The method of claim 16, further comprising chlorinating the surface before applying the polymer system onto the interior surface, such that the surface includes chlorination levels between 0 parts per million (ppm) and 600 ppm.

* * * * *